US012172673B2

(12) United States Patent
Kuehner et al.

(10) Patent No.: US 12,172,673 B2
(45) Date of Patent: Dec. 24, 2024

(54) SYSTEM AND METHOD FOR PROVIDING FRICTION CIRCLE FEEDBACK FOR VEHICLE SAFETY

(71) Applicant: TOYOTA RESEARCH INSTITUTE, INC., Los Altos, CA (US)

(72) Inventors: Manuel Ludwig Kuehner, Mountain View, CA (US); Jaime Camhi, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 158 days.

(21) Appl. No.: 17/578,233

(22) Filed: Jan. 18, 2022

(65) Prior Publication Data
US 2023/0227070 A1 Jul. 20, 2023

(51) Int. Cl.
*B60W 60/00* (2020.01)
*B60W 30/18* (2012.01)

(52) U.S. Cl.
CPC .. *B60W 60/0015* (2020.02); *B60W 30/18109* (2013.01); *B60W 2510/20* (2013.01); *B60W 2552/40* (2020.02)

(58) Field of Classification Search
None
See application file for complete search history.

(56) References Cited

U.S. PATENT DOCUMENTS

| 10,543,853 | B2 | 1/2020 | Toyoda |
| 10,586,454 | B2 | 3/2020 | Toyoda |
| 10,913,491 | B2 | 2/2021 | Lesbirel |
| 10,981,572 | B2 | 4/2021 | Imamura |
| 2011/0295464 | A1* | 12/2011 | Zagorski ............ B62D 15/0265 701/41 |
| 2019/0064870 | A1 | 2/2019 | Krehl |
| 2019/0263399 | A1 | 8/2019 | He |
| 2019/0283779 | A1 | 9/2019 | Sohoni |
| 2019/0291728 | A1* | 9/2019 | Shalev-Shwartz ........... B60W 50/087 |
| 2020/0216090 | A1 | 7/2020 | Zaseck |

(Continued)

FOREIGN PATENT DOCUMENTS

EP 3318946 A1 5/2018

*Primary Examiner* — Christian Chace
*Assistant Examiner* — Shayne M. Gilbertson
(74) *Attorney, Agent, or Firm* — SHEPPARD, MULLIN, RICHTER & HAMPTON LLP; Daniel N. Yannuzzi

(57) ABSTRACT

System and methods are provided for implementing friction circle safety controls in a vehicle, such as an autonomous vehicle. A system can apply a friction circle analysis during the vehicle's operation, in order to perform a safety-based evaluation of maneuvers that impact the dynamic relationship between a vehicle's tires and a road surface. The system also establishes a link between the vehicle's lateral controls (e.g., steering wheel) and the vehicle's longitudinal controls (e.g., brake and throttle pedals), such that a frictional force of the tires against the road's surface, does not does not exceed a traction limit (e.g., limit of a tire's grip on the road surface) for the particular vehicle. For example, friction circle safety controls can automatically provide feedback and/or automatic driving actions to adjust a relationship between the steering wheel and brake/throttle pedals of the vehicle to maintain operation of the vehicle within the friction circle.

20 Claims, 5 Drawing Sheets

(56) References Cited

U.S. PATENT DOCUMENTS

2022/0319250 A1\* 10/2022 Kakutani ............... B60K 35/00
2023/0166765 A1\* 6/2023 Yoon .................... B60W 10/18
　　　　　　　　　　　　　　　　　　　　701/24

\* cited by examiner

SYSTEM AND METHOD FOR PROVIDING FRICTION CIRCLE FEEDBACK FOR VEHICLE SAFETY

TECHNICAL FIELD

The present disclosure relates generally to computer-controlled vehicle safety technology. In particular, various embodiments describe a vehicle that includes the capability to provide computer-controlled feedback, such as automatic maneuvers, in order to control the vehicle with respect to friction as an enhanced safety control feature.

DESCRIPTION OF RELATED ART

Vehicle accidents (e.g., collisions) are a constant threat to drivers, passengers, pedestrians and property. Accidents, which unfortunately result in injury, in some instances, may be caused by the driver. For instance, "driver caused" accidents may be attributed to: a delay in a driver's recognition of a hazardous situation, the driver ability to react accordingly to a hazardous situation, and/or unknowingly maneuvering the vehicle in a manner that is extremely unsafe in the current conditions of the vehicle, road, and/or surroundings. According to NHTSA, there were over 7.2 million reported car accidents in 2016—many of which were avoidable. It may be beneficial to equip vehicles with mechanisms that can detect conditions that impact safety and/or mechanisms that cause the vehicle (or driver) to react in a manner that promotes safety (e.g., collision prevention), in order to help protect drivers, passengers, people in other vehicles on the road, and pedestrians from harm.

BRIEF SUMMARY OF THE DISCLOSURE

In accordance with embodiments of the disclosed technology, friction circle safety control methods and systems are implemented in a vehicle. As disclosed herein, the friction circle safety controls can involve applying a friction circle analysis during the vehicle's operation, in order to perform a safety-based evaluation of maneuvers that impact the dynamic relationship between a vehicle's tires and a road surface. In an embodiment, the system establishes a link between the vehicle's lateral controls (e.g., steering wheel) and the vehicle's longitudinal controls (e.g., brake and throttle pedals), such that a frictional force of the tires against the road's surface which results from maneuvering the vehicle while driving (e.g., accelerating, and turning in a direction) does not does not exceed a traction limit (e.g., limit of a tire's grip on the road surface) for the particular vehicle.

In an embodiment, the friction circle safety controls can be configured to automatically synchronize an allowable movement between a vehicle's steering wheel and the vehicle's brakes and/or throttle pedal. By dynamically analyzing the connection between a vehicle's lateral movement (e.g., brakes and/or throttle) and longitudinal movement (e.g., steering wheel), the system can detect when a vehicle is approaching its tire's tractional limit, and automatically executes actions which prohibits the driver from performing a maneuver where the vehicle is being operated outside the friction circle, thereby increasing the potential for an unsafe loss of traction and tire slippage. For example, if the vehicle is traveling at a high rate of speed during operation, the friction circle safety system may allow the driver to steer the vehicle slightly to the right or left, but prevents the steering wheel from moving past a position that would result in the vehicle losing traction at one or more wheels.

Conversely, in the event where the driver of the vehicle slows the vehicle down, the friction circle safety control system will allow greater movement of the steering wheel because, with reduced speed, the driver can make a sharp return but stay within the friction circle. As such, the friction circle safety control system links a freedom of movement of the steering wheel and the brake/throttle pedal to each other so that a driver can be lead, by automatic actions of the system for example, to stay within the friction circle. According to the embodiments, the automatic actions of the friction control safety control system comprises, at least, feedback provided to the driver of the vehicle during operation. The feedback can include a computer generated visual, audible, haptic, or tactile output that indicates the tradeoff between lateral and longitudinal maneuvers that can occur to maintain the vehicle within the friction circle. That is, as the driver, for example, executes a right turn (e.g., longitudinal movement), the friction circle safety control system can automatically provide feedback to the driver, such as feedback impacting the steering wheel input controls and/or the throttle/brake pedals input controls of the vehicle. For example, the feedback is a tactile resistive weight that is applied against the steering wheel, which discourages (or prevents) the driver from continuing to turn the steering wheel to the right. Furthermore, the system continues to analyze the vehicle's movement during feedback, for example preventing the driver from turning the steering wheel, until the driver provides the appropriate tradeoff in lateral movement, for instance by applying the brake to reduce the speed of the vehicle. In this way, the friction circle safety control system informs the driver about the vehicle's friction limits (or traction limits) associated with the friction circle and certain maneuvers while the vehicle is being driven, such that unsafe moves (e.g., causing tires to lose grip on the road, and vehicle sliding out of control) made by the driver are reduced and the driver can better learn how to control the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Some vehicles include computer-controlled operational modes, such as vehicles having adaptive cruise control mode and automated vehicles, in which a computing system is used to navigate and/or maneuver the vehicle along a travel route. Furthermore, vehicles can include advancements and innovations in safety that help prevent crashes and protect people. For example, some vehicles are equipped with technology, such as computer-controlled vehicle safety systems, that are designed to support driver awareness, decision making and vehicle operation over a wide range of speeds. There are vehicle safety systems that provide features which help address several key areas of accident protection: preventing or mitigating frontal collisions (e.g., collision detection), keeping drivers within their lane (e.g., lane departure alert), and enhancing road safety during nighttime driving (e.g., automatic high beams). However, even with the advent of such vehicle safety systems, drivers themselves mostly responsible for driving the vehicle properly for their own safety, and should always drive safely, obey traffic speed limits and laws and focus on the road. Nonetheless, it is possible for a driver to encounter road conditions and/or scenarios that can cause moving the vehicle in a certain way unsafe, unbeknownst to the driver. As an example, a vehicle that is being driven in the rain, can experience additional hazards due to the road's surface being surface wet. Making a turn as the vehicle accelerates at a higher rate of speed, while otherwise typically safe in normal conditions (e.g., dry road), in the rain can cause one or more of the vehicle's tires to lose their frictional grip on the road and slip, which can further increase the potential of an accident, collision, and bodily harm.

Figure 1:
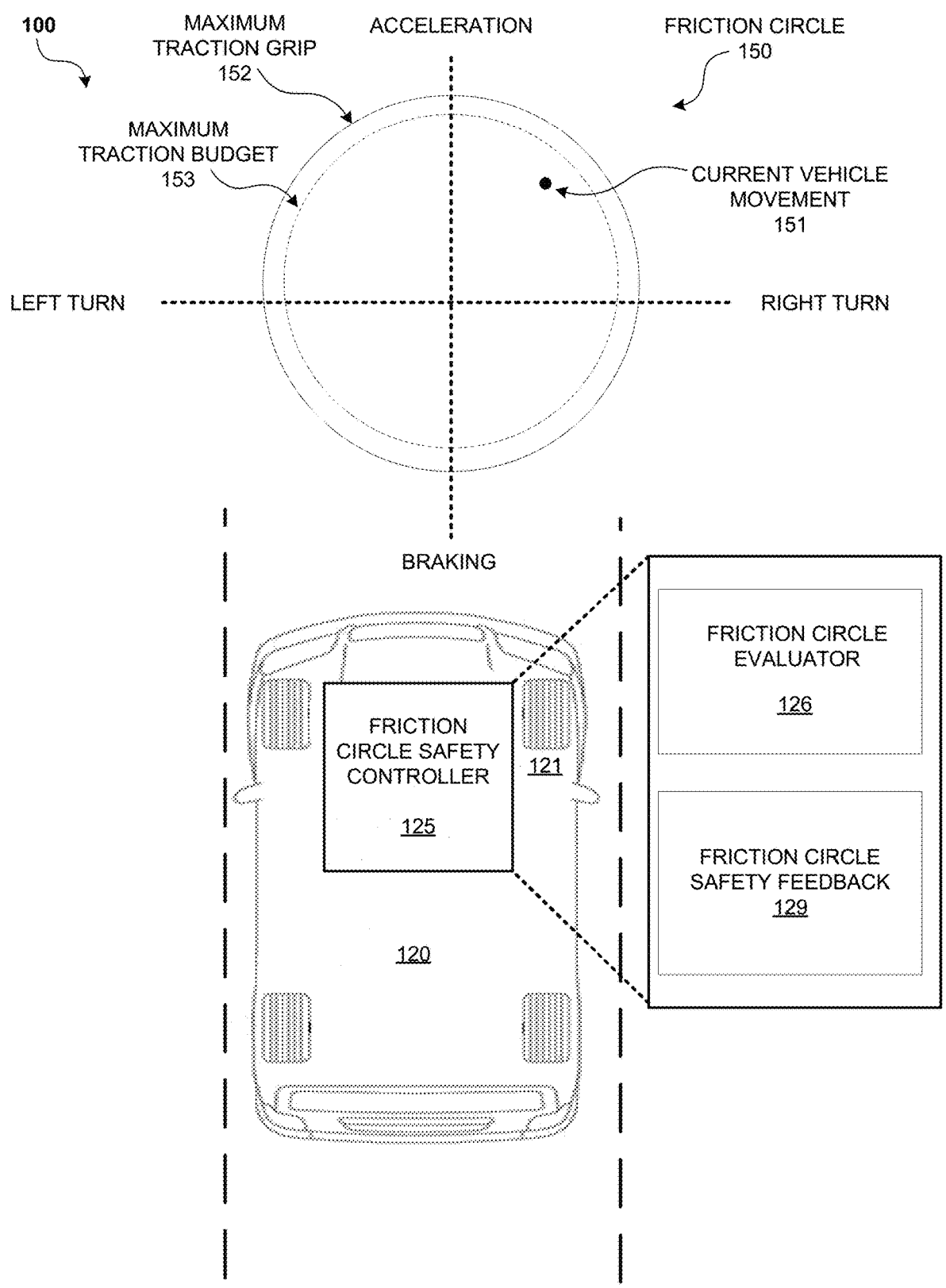
FIG. 1 is an example road environment including a vehicle utilizing a friction circle safety control system, in accordance with an embodiment of the technology disclosed herein.

Referring now to FIG. 1, an example of a road environment 100 is depicted, which includes a vehicle 120 that is configured to implement the friction circle safety control system, as disclosed herein. Generally, by performing a safety-based analysis using a friction circle 150, the vehicle 120 can evaluate the dynamic interaction between each of the vehicle's tires 121 and the road surface, and in response can automatically trigger feedback and/or driving operational actions (e.g., operation of one or more control inputs, such as the steering wheel and throttle pedal and/or brake pedal) in a manner that prevents the driver from unsafety operating the vehicle outside of the friction circle to reduce dangerous tire slippage and loss of fictional traction.

FIG. 1 illustrates that the vehicle 120 is operational, for instance being driven at a certain speed in a lane on the roadway. In particular, FIG. 1 shows the vehicle 120 as including a friction circle safety controller 125. The friction circle safety controller 125 can be implemented as a vehicle controller, computing hardware, software, firmware, or a combination thereof. As such, the friction circle safety controller 125 is programmed to generate a friction circle 150 for the vehicle 120, and subsequently provide feedback and/or driving actions to control the vehicle with respect to the friction circle, in accordance with the disclosed techniques. The friction circle safety controller 125 may be a standalone controller in some embodiments. Alternatively, the friction circle safety controller 125 may be implemented by configuring a main vehicle onboard processor or CPU. Further, FIG. 1 illustrates that the friction circle safety controller 125 can include several other components and data. In the example of FIG. 1, the friction circle safety controller 125 includes: 1) the friction circle evaluator 126 which is configured to determine, or otherwise calculate, a friction circle, and further dynamically analyze movement of the vehicle based on the friction circle; and 2) friction circle safety feedback module 129 which is configured to provide feedback and/or automatic driving actions. As will be described in greater detail herein, the feedback and/or automatic driving actions can include adjusting a relationship, or tradeoff, between lateral control input of the vehicle (received from the steering wheel) and longitudinal control input of the vehicle (received from throttle/brake pedals) in order to maintain the operation of the vehicle within the friction circle.

A key data structure that can be generated, maintained, and analyzed by the friction circle safety controller 125 is the friction circle 150. In the example of FIG. 1, the friction circle 150 is depicted conceptually as a coordinate system, including an x-axis representing the lateral acceleration of the vehicle 120 that may be imparted by the driver turning the steering wheel, and a y-axis representing the longitudinal acceleration of the vehicle 120 that may be imparted by the driver engaging the throttle and/or brake pedal.

According to the embodiments, a friction circle 150 can be uniquely generated for a particular vehicle, such that each vehicle can have a different and distinct friction circle that is based on specific attributes of the vehicle, such as the type of tires, the make of the vehicle, the model of the vehicle, and the like. Referring to the example in FIG. 1, the friction circle 150 is a plot on a chart that is generated by the friction circle safety controller 125, and distinctly corresponds to the attributes of vehicle 120. For example, the friction circle 150 represents a maximum grip for the particular tires 121 that are on vehicle 120 in both the lateral direction (cornering left or right) shown on the x-axis, and the longitudinal direction (braking and accelerating) shown on the y-axis. Therefore, as alluded to above, every vehicle can have a certain respective maximum traction limit that depends on the vehicle's design, vehicle condition, the road conditions, and other vehicle and/or operational characteristics. There is a tradeoff between lateral and longitudinal forces that any vehicle, namely vehicle 120, can handle at the tires' limits of traction. To reiterate, the fictional traction capabilities of a vehicle on the current road conditions can be depicted by its corresponding friction circle. Although the disclosed systems and functions are described having a single friction circle that corresponds to the vehicle (including all four tires 121) for purposes of illustration, this implementation is not intended to be limiting. In some embodiments, a friction circle can be independently calculated for one or more tires 121 of the vehicle 120. Thus, in some embodiments, vehicle 120 can have four different friction circles (not shown), such that there is a different friction circle that respectively corresponds to each one of the tires 121 on the vehicle 120.

Accordingly, when the vehicle 120 is maneuvered in such a way that it is operating outside of its calculated friction circle 150, it can be assumed that one more of the tires 121 is beyond its maximum traction limit. For example, if the driver sharply turns the steering wheel such that the vehicle's 120 current movement 151 (described in greater detail below) in the lateral direction is outside of the friction circle 150, this maneuvering greatly increases the likelihood the tires 121 of the vehicle 120 may slip, potentially resulting in a dangerous situation, such as the vehicle 120 spinning out of control (due to tires 121 not having proper fractional traction on the road). Therefore, in order to enhance safety with respect to frictional traction of the tires 121, the friction circle safety feedback module 129 is configured to automatically trigger feedback to the driver, such as a haptic cues impacting the steering wheel controls and/or the throttle/brake controls of the vehicle, and visual cues that are displayed in the vehicle in a manner recognizable to the driver. As an example, the friction circle safety controller 125 may generate a visual cue that is displayed on the screen of the vehicle's 120 head unit display system (e.g., Multi-information Display) to warn the driver that they are approaching the bounds of the friction circle 150. Further in the scenario when the driver is warned of approaching the bound of the friction circle 150, the friction circle safety controller 125 can also calculate an appropriate tradeoff between lateral force and longitudinal force on the vehicle 120 that can be translated into one or more maneuvers that can be performed by the driver to prevent the movement of the vehicle 120 from exceeding and/or operating outside of the friction circle 150. For instance, the friction circle safety controller 125 can determine, and subsequently display to the driver, that decelerating the vehicle (e.g., reducing the longitudinal force on the tires 121) to a certain speed can compensate for the sharp turn (e.g., high lateral force on the tires 121) in a manner that maintains the vehicle's 120 operation within the friction circle (e.g., under the maximum traction limit). In some embodiments, the friction circle safety controller 125 employs the friction circle safety feedback module 129 to trigger an automated driving action, for instance autonomous control of the throttle/brake pedals, to compensate for the driver's input to the steering wheel, to prevent the movement of the vehicle 120 from exceeding and/or operating outside of the friction circle 150. The friction circle safety controller 125 can generate autonomous (or semi-autonomous) driving actions to ensure that the vehicle 120 is operated within the friction circle 150, which reduces the risks of the vehicle 120 being operated in an unsafe maneuver. For example, the vehicle can employ autonomous driving capabilities in order to: 1) autonomously accelerate and/or decelerate the vehicle to compensate for the steering wheel input with respect to the friction circle; and 2) autonomously steer the vehicle to compensate for the throttle/brake pedal inputs with respect to the friction circle.

Also shown in FIG. 1, the friction circle safety controller 125 is configured to determine the current movement of the vehicle, which is illustrated as a point 151 on the friction circle 150. The friction circle safety controller 125 can analyze data obtained by on-vehicle sensors, in order to identify an amount of longitudinal acceleration and lateral acceleration that the vehicle 120 is experiencing from how the driver is currently moving the vehicle 120 on the road. As previously mentioned, the friction circle safety controller 125 can be in communication with several sensors of the vehicle that can determine vehicle data, including, but not limited to: the speed and acceleration of the vehicle; road grip information; data from monitoring the braking system of the vehicle; road conditions data (e.g., ice, snow, rain, etc.); tire type; vehicle weight; vehicle center of gravity; and the like. This vehicle data may be analyzed to generate the friction circle 150 for the vehicle 120, and further to dynamically determine the current vehicle movement 151 within the friction circle 150.

In operation, based on the analysis of vehicle data, the current movement of vehicle 120 can be ascertained by the friction circle safety controller 125 (namely the friction circle evaluator 126). Thus, the corresponding current vehicle movement 151, shown as the point inside of the friction circle 150, represents the vehicle's 120 current movement (specifically lateral acceleration and longitudinal acceleration of the vehicle that contributes to the friction force interaction between the vehicle's tires 121 and the road) with respect to the friction circle 150. The circumference of the friction circle 150 can represent a maximum friction traction limit of the tire's 121 grip. FIG. 1 illustrates that the boundary at the friction circle's 150 circumference (shown in FIG. 1 as solid line on friction circle 150) indicates this maximum traction grip 152 allowable for the vehicle 120. The current vehicle movement 151 can be a point that is a representation of the vehicle's 120 current traction consumption, corresponding to how the vehicle 120 is currently being maneuvered in operation by the driver, and in relation to the maximum traction grip 152 and the maximum traction budget 153 (which is described in greater detail below). In other words, as the point 151 approaches the maximum traction grip 152 boundary of the friction circle 150, this indicates that the vehicle is being maneuvered in a manner that is getting closer to the tire's maximum traction, and thus increasing the potential that the tires 121 will lose their grip on the road's surface. Even further, when the point 151 reaches or exceeds the maximum traction grip 152 boundary, and is outside of the friction circle 150 for example, this can indicate that the vehicle 120 is moving in a manner where the tires 121 are experiencing forces beyond its traction capabilities, and may be slipping and/or losing grip to the road.

According to the embodiments, the friction circle safety controller 125, namely the friction circle evaluator 126, can determine a maximum traction budget 153 that is allotted for a vehicle's 120 operation, where the maximum traction budget 153 is less than the actual maximum traction grip of the tires 121 on the vehicle's 120. In this case, the maximum traction budget 153 can be a threshold that is calculated by the friction circle safety controller 125, and is deemed as an appropriate amount of combined latitudinal and longitudinal force on the tires 121 that safely maintains the operation of the vehicle within the friction circle 150. For example, the maximum traction budget 153 can be a frictional force threshold that is calculated as a percentage of the total maximum traction grip for the vehicle's 120 tires. This is illustrated conceptually in FIG. 1, as the maximum traction budget 153 for the vehicle 120 is depicted as a circle (shown in FIG. 1 as dashed lined circle) that is "inside" of the friction circle 150, and having a smaller circumference than the friction circle 150. Furthermore, in operation, as the driver maneuvers the vehicle 120, which causes the current vehicle movement 151 to be repositioned within the friction circle 150, it can be assumed that an amount of applied lateral movement (from steering wheel input by the user) and/or longitudinal movement (from throttle/brake pedal input by the user) would cause the boundary (dashed line) of the maximum traction budget 153 to be crossed by point 151 before crossing the boundary (solid line) of the maximum traction grip. Thus, by setting the maximum traction budget 153 at a threshold of 80% of the tires' maximum traction grip, the friction circle safety controller 125 can configured to trigger feedback to the driver upon exceeding the maximum traction budget 153, as opposed to waiting until the bounds of the friction circle 150 are exceeded. Consequently, the driver can be warned that they are maneuvering the vehicle 120 in a manner that is approaching the tires' maximum traction capabilities (boundary of the friction circle 150), while the vehicle 120 should still be within a level of lateral and longitudinal force that is safe for the tires 121 traction constraints (and gives the driver time to adjust the tradeoff between lateral input controls (e.g., steering wheel) and longitudinal input controls (e.g., throttle/brake pedals) on the vehicle 120. It should be appreciated that the maximum traction budget, as disclosed herein, may be a static or dynamically adjusted threshold value that is represented in a manner other than a percentage, such an amount, fraction, portion, rate, proportion, etc. in relation to the maximum traction grip (or the friction circle) that is deemed safe and/or appropriate.

As an operational example, the driver may be currently pressing the throttle pedal, which accelerates the vehicle 120 forward in the longitudinal direction, while simultaneously turning the steering wheel to the right, which accelerates the vehicle 120 in the lateral direction. The friction circle evaluator 126 can perform analysis of the vehicle data, in order to dynamically determine the current vehicle movement with respect to the friction circle. Thus, the corresponding point 151 that represents the vehicle's 120 current movement is within the quadrant (upper, right) of the friction circle 150 plot that corresponds to an amount of positive acceleration to the right and an amount of positive acceleration forward. Further, FIG. 1 shows that the vehicle 120, at point 151, is currently being driven "inside" of the circumference of the maximum traction budget 153 circle and "inside" of the circumference of the friction circle 150. Consequently, the vehicle 120 operating within its frictional limit (e.g., maximum traction budget). In cases where the friction circle safety controller 125 determines that the vehicle 120 is operating within the vehicle's 120 friction circle 150, the controller 125 may not provide any feedback to the driver and/or provide any automatic driving actions to correct its maneuvering, since the vehicle 120 has been deemed as operating safely with respect to the tire's 121 traction. In some embodiments, the friction circle safety controller 125 is configured to continuously display the friction circle 150, the maximum traction budget 153 circle, and the current vehicle movement 151 as a point that dynamically moves about within the friction circle 150, based on how the vehicle is being maneuvered. This feature of the system may be advantageous in various driver trainer scenarios, such as race car simulations and new driver training, as a tool that allows the driver to have a continued awareness of their maneuvering's impact on the tire's traction, and to gain an understanding of the linkage between input into the steering wheel (lateral acceleration) and input into the throttle/brake pedals (longitudinal acceleration) to appropriately maintain the traction budget for the vehicle.

Conversely, there may be scenarios where the vehicle 120 is being driven such that the lateral force and longitudinal force being applied on the tires 121 is approaching the maximum traction budget 153 for the vehicle 120. For example, the vehicle 120 may be approaching a sharp bend in the road (e.g., small radius of curvature), where the driver is turning the steering wheel sharply to the right, without pressing on the brake pedal to slow down the vehicle's forward acceleration. As a result, the friction circle safety controller 125 can determine that the driver's current maneuver is causing the current vehicle movement 151 point to move closer to the boundary (dashed line) of the maximum traction budget 153. As the driver continues in this sharp turn, steering the steering wheel even further to the right, this increased lateral movement can be enough to cause the friction circle evaluator 126 to plot the point corresponding to the current vehicle movement 151 approximately at the boundary line (dashed line) of the maximum traction budget 153. Thus, the friction circle safety controller 125 is determining that the tires 121 are experiencing a combined lateral and longitudinal force that is meeting the threshold set by the maximum traction budget 153. As previously described, when the friction circle safety controller 125 determines that the vehicle 120 is meeting and/or exceeding the maximum traction budget 153, this may indicate that the tires 121 of the vehicle 120 are dangerously nearing their frictional grip limit 152 in the current maneuver made by the driver. In response to determining that the vehicle 120 has passed the "safety" threshold of the maximum traction budget 153, and is approaching the boundary of the friction circle 150, the friction circle safety feedback module 129 can be commanded to provide feedback to the driver and/or effectuate an automatic driving action to correct its maneuvering. For instance, the friction circle safety feedback module 129 may generate feedback for the driver, which is output as a visual warning displayed on the head unit display. Further, the friction circle safety feedback module 129 may display information associated with the interactional link between lateral inputs and longitudinal inputs on the tire's frictional traction to allow for the user to maintain the vehicle's operation within the frictional circle 150 (and within the maximum traction budget 153 circle). Continuing with the example where the driver is maneuvering the vehicle 120 in a sharp right turn at a high speed, the friction circle safety feedback module 129 may display to the driver multiple choices of adjustments to improve traction based on the link between lateral inputs and longitudinal inputs. For example, adjustment choices presented to the driver by the friction circle safety controller 125 can include: 1) reduce forward acceleration and/or decelerate the vehicle by pressing on the brake pedal, and maintain the current steering wheel input; or 2) maintain the current throttle pedal input, and reduce the sharpness of the turn by turning the steering wheel to the left. By understanding this connection between the steering wheel input (lateral movement) and the throttle/brake pedals input (longitudinal movement) on the vehicle's traction budget, the driver can learn and become more cognizant on how to safely drive within the friction circle and maneuver appropriately for the tires' traction capabilities.

There may be other scenarios where the vehicle's 120 movement may approach the tire's maximum traction grip 152 in a manner that would be deemed as unsafe. For example, if the driver presses firmly on the throttle, which significantly accelerates the vehicle 120 forward, and then turns sharply turn to the left, the vehicle 120 would be in danger of operating outside the friction circle 150 (e.g., point 151 in upper, left quadrant and outside of friction circle 150) and the tires 121 may start slipping. In another potential scenario, the vehicle 120 may be making a wide turn to the right, but accelerating so fast such that there is still the potential of operating outside the friction circle 150 (e.g., point 151 in upper, right quadrant close to the y-axis and outside of friction circle 150). In these situations (and other situations not expressly described), the friction circle safety controller 125 can determine, based on the current movement of the vehicle, that the driver is performing an unsafe maneuver, where the vehicle 120 is in danger of one or more tires 121 losing its frictional grip on the road's surface in a manner that can cause loss of control, accident, collisions, and the like. Consequently, the friction circle safety controller 125, in response to determining that the vehicle 120 is currently operating at or beyond the maximum traction budget 153, the controller 125 provides feedback to the driver and/or effectuates an automatic driving action to correct its maneuvering, since the vehicle 120 has been deemed as operating unsafely with respect to the tire's 121 traction.

As alluded to above, the friction circle safety controller 125 can determine, or otherwise calculate, the maximum traction budget 153 for the vehicle 120. The maximum traction budget 153 can be an amount of total acceleration (less than the tires' maximum traction grip) that can be performed by the vehicle 120 while maneuvering such that the tires 121 do not lose traction with the road surface. In other words, if a driver is maneuvering vehicle 120 in such a way where the longitudinal acceleration or/and the lateral acceleration does not exceed its corresponding maximum traction budget (represented as maximum traction budget 153 circle in relation to the friction circle 150) it can be assumed that the vehicle 120 is being operated within its friction circle 150, and thereby is driving safely with a decreased potential of the tires 121 losing their grip on the road's surface and slipping.

As an example, when the vehicle 120 is not being driven forward (e.g., driver is not pressing the throttle pedal), then there is no longitudinal acceleration (e.g., none of the maximum traction budget is being consumed by longitudinal acceleration) and the complete traction budget for the vehicle 120 is available for lateral acceleration. Thus, in this scenario, the driver can make a sharp turn to the left or to the right (while the car is not accelerating forward) and that maneuvering will still keep the vehicle 120 within its friction circle 150. Drivers, especially professional drivers, need to understand the tradeoff between lateral acceleration (e.g., turning the steering wheel) and longitudinal acceleration (e.g., pressing the throttle and/or brake pedal) with respect to the frictional traction of the tires 121 (e.g., maximum traction budget) and safety. As such, in situations where the vehicle 120 is moving rapidly (having a high longitudinal acceleration), the ability to turn the vehicle and incur lateral acceleration such that the traction of the vehicle's tires 121 stays within the friction circle 150 is limited. Conversely, if the vehicle 120 is traveling very slowly (having small longitudinal acceleration), the ability to turn the vehicle, and incur lateral acceleration while remaining within the friction circle 150, is far greater. Thus, FIG. 1 illustrates that vehicle 120 can receive and analyze data, and employ other vehicle components and/or systems, such as the friction circle safety controller 125, to provide feedback to the driver and/or perform automated actions that prevents the vehicle from being driven in manner where one or more of the tires 121 lose traction, and overall improves the safety of the vehicle on the road environment.

Figure 2:
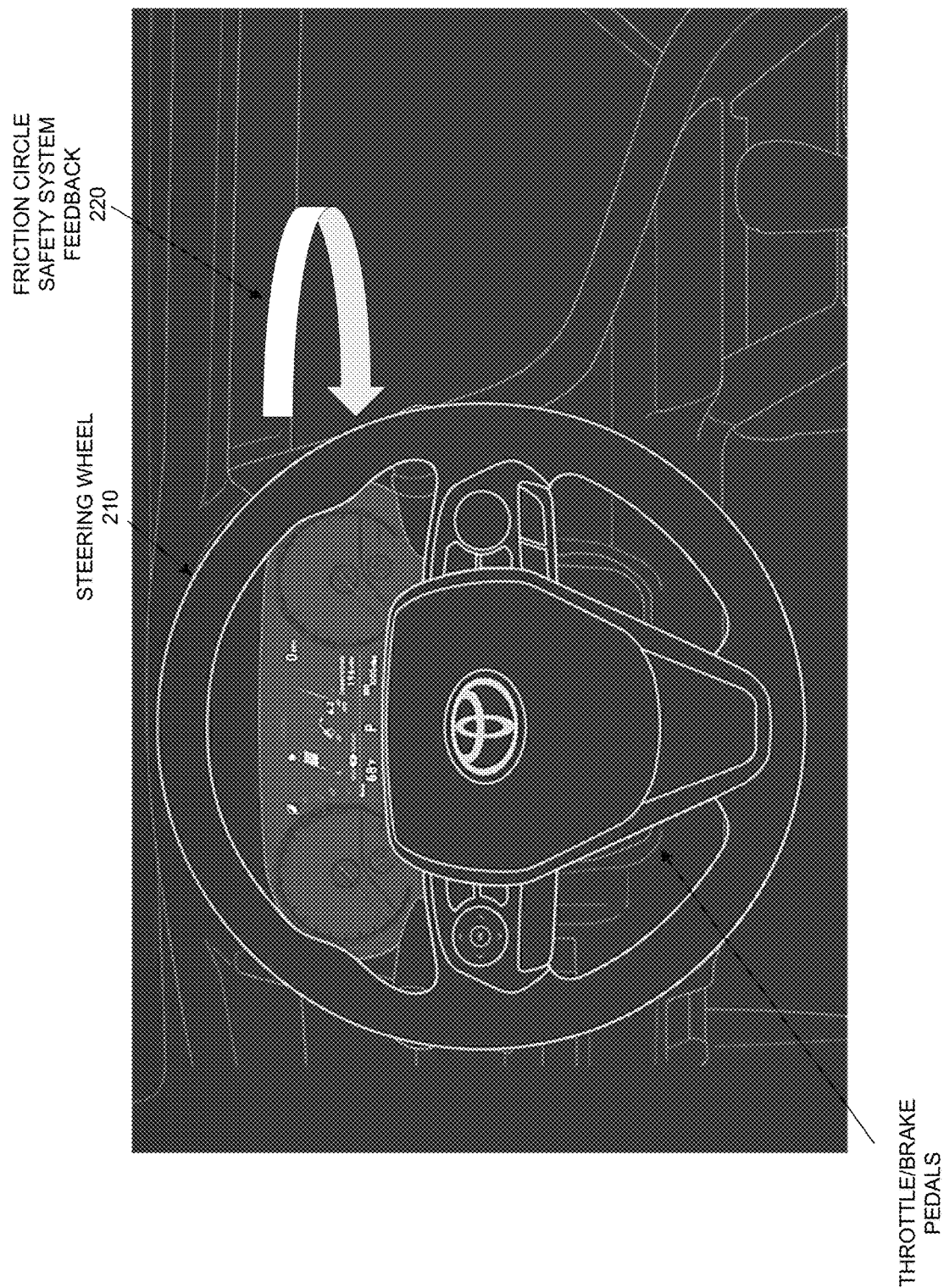
FIG. 2 depicts an example interaction of the friction circle safety control system on a vehicle, in accordance with an embodiment of the technology disclosed herein.

According to the embodiments, the friction circle safety controller (shown in FIG. 1) is configured to perform at least two principle operations, including: 1) determining the friction circle 150; and 2) providing feedback and/or automatic driving actions which preventing the driver from maneuvering the vehicle such that the traction of the vehicle is outside of the friction circle. FIG. 2 illustrates a steering wheel 210 of a vehicle that is implementing the disclosed friction circle safety controls, such that a virtual link is generated between the lateral control of the steering wheel 210, and the longitudinal controls of brake and throttle pedals 215. For instance, when it is determined that the vehicle is approaching the limits of traction (e.g., meeting and/or exceeding the maximum traction budget, as previously described), the friction circle safety control system can effectuate feedback to the user. The feedback generated provided to the user can be visual cues, such as warnings and information on the link between the input controls to the steering wheel 210 the input controls to the brake and throttle pedals 215. The feedback can also include haptic cues, such as a resistance force on steering wheel 210, such that the driver is discouraged from, or cannot, continue to steer the vehicle in a manner that exceeds the tires traction limit (or maximum traction budget) outside of the vehicle's friction circle. Another example of a haptic cue is a mechanical pressure applied down to the brake pedal 215 that is implemented using an electro-mechanical mechanism interacting with the brake and throttle pedals 125. This haptic cue on the brake may encouraged the driver to further press on the brake pedal 215, engaging the brakes in a manner that decelerates the vehicle, and prevents the driver from exceeding the tires traction limit (or maximum traction budget) outside of the vehicle's friction circle. In a similar manner, a haptic cue can apply resistive pressure on the throttle pedal 215 that is implemented using an electro-mechanical mechanism interacting with the brake and throttle pedals 125. This haptic cue may discourage the driver from further pressing on the throttle pedal 215 in a manner that increase the vehicle's forward acceleration, and by preventing the driver from going any faster, the driver can compensate input to the steering wheel 210 to not exceed the tires traction limit (or maximum traction budget) outside of the vehicle's friction circle.

For example, while driving the vehicle along a curved portion of a road, there is a maximum lateral and longitudinal input that is possible before making the vehicle's tire traction go unstable by operating outside of the friction circle. Thus, in the event that the friction circle safety control system determines that the vehicle is at the maximum traction budget (i.e., represented by the circumference of the maximum traction budget circle) and/or approaching its tractional grip limit (i.e., represented by the circumference of the friction circle), the system can generate feedback for the user and/or perform an automated driving action that ensure the vehicle remains in its stable region within the friction circle. FIG. 2 illustrates an example where the feedback 220 is effectuated on the steering wheel 210. In some embodiments, feedback 220 is implemented by the friction circle safety control system communicating controls and/or commands to electro-mechanical components of the steering wheel 210 such that the column of the steering wheel 210, for example, experiences resistance in an angular direction that is deemed appropriate for correcting the unsafe maneuver. As an operational example, the driver may be steering the steering wheel 210 sharply to the right while accelerating forward at a high rate of speed, which places the vehicles current movement near the limit of its friction circle. Thus, if the driver continues to increase the steering wheel's 210 steering angle to the right, it would lead to an unsafe maneuver which can further cause the tires to lose their grip on the road.

Thus, in this scenario, the friction circle safety control system can provide feedback 220 to the steering wheel 210, which is a resistance that is applied to the steering wheel 210 in the opposite direction, namely a left angular resistance force, which prevents the driver from turning the steering wheel 210 in a greater angle to the right, and effectively ensures that the driver cannot make the maneuver that is predicted to be unsafe and cause the tires to lose traction. In another operation, the friction circle safety control system can provide feedback 220 that is more directed to the tradeoff between the steering wheel 210 input (e.g., lateral acceleration) and the throttle/brake pedals 215 input (e.g., longitudinal acceleration), where the aim is to balance the dynamic interaction between the steering wheel 210 and the throttle/brake pedals 215 such that the current movement of the vehicle, in both the lateral and longitudinal directions, remains below the vehicle's maximum traction budget by remaining within the friction circle.

Referring back to the example, if the driver continues to turn the steering wheel 210 to the right, the friction circle safety control system provide feedback by communicating controls to the brake pedal 215 to engage, such that the forward acceleration is decreased in a manner that accounts for the increased lateral acceleration, and maintains the vehicle's motion within the friction circle. In other words, the friction circle safety control system is configured to effectuate feedback and/or automatic driving actions to the steering wheel 210 and/or the throttle/brake pedals 215 to appropriately adjust for lateral acceleration and/or longitudinal acceleration (in response to the current movement of the vehicle) such that the maneuvering of the vehicle remains safely within the friction circle.

Although not depicted in FIG. 2, in some embodiments, the friction circle safety control system can generate notifications, warnings, alerts, and other visual, audio, and tactile outputs that enable drivers to assist or otherwise prevents the driver from maneuvering the vehicle in a manner that violates the limits of the established friction circle. For example, a visible graphical animation of the vehicle's friction circle can be displayed on the head unit display of the vehicle in a manner that allows the driver to control the vehicle to visible keep is current movement point within the friction circle.

Figure 3:
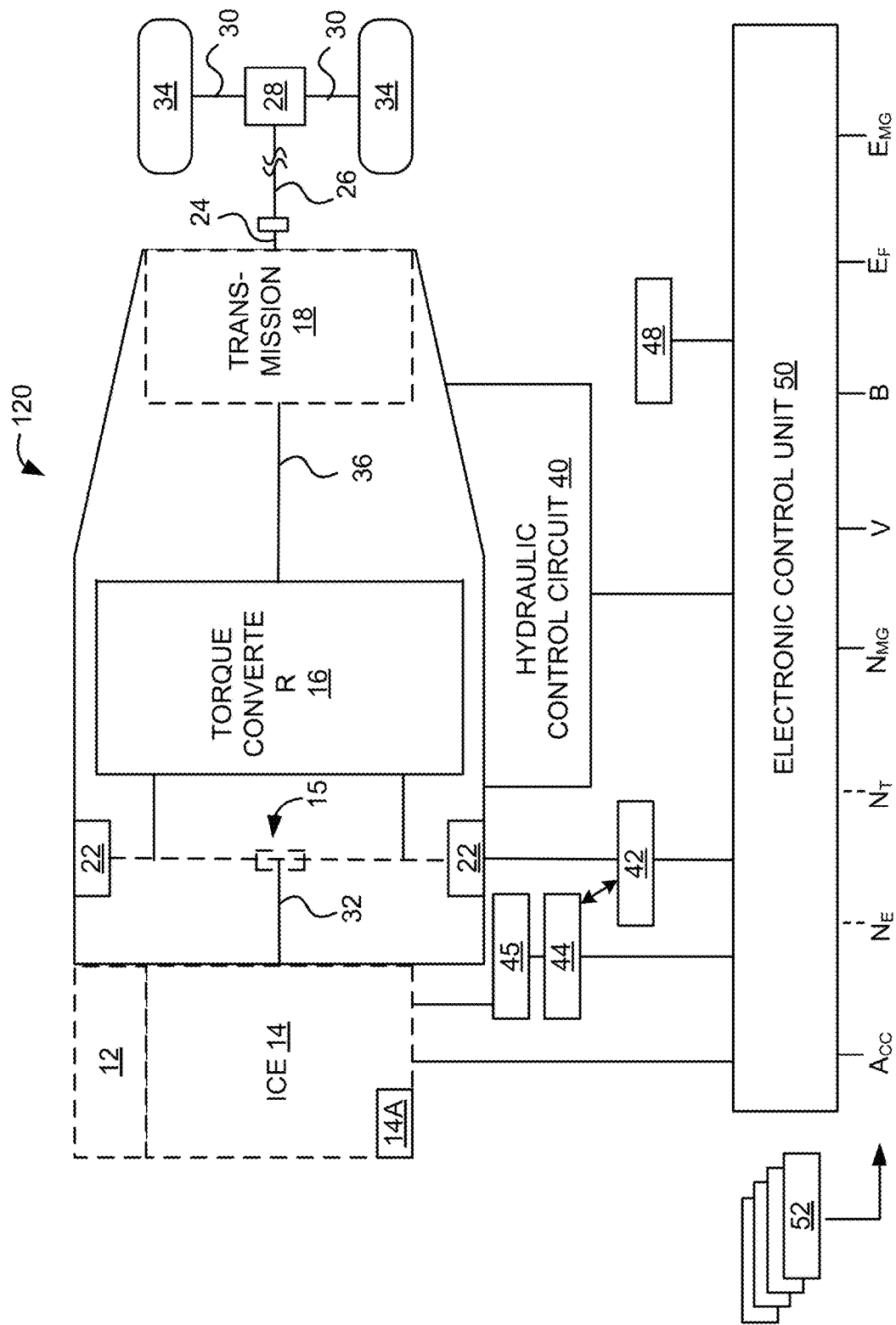
FIG. 3 is a schematic representation of an example vehicle with which embodiments of the friction circle safety control system disclosed herein may be implemented.

FIG. 3 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 3, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 4:
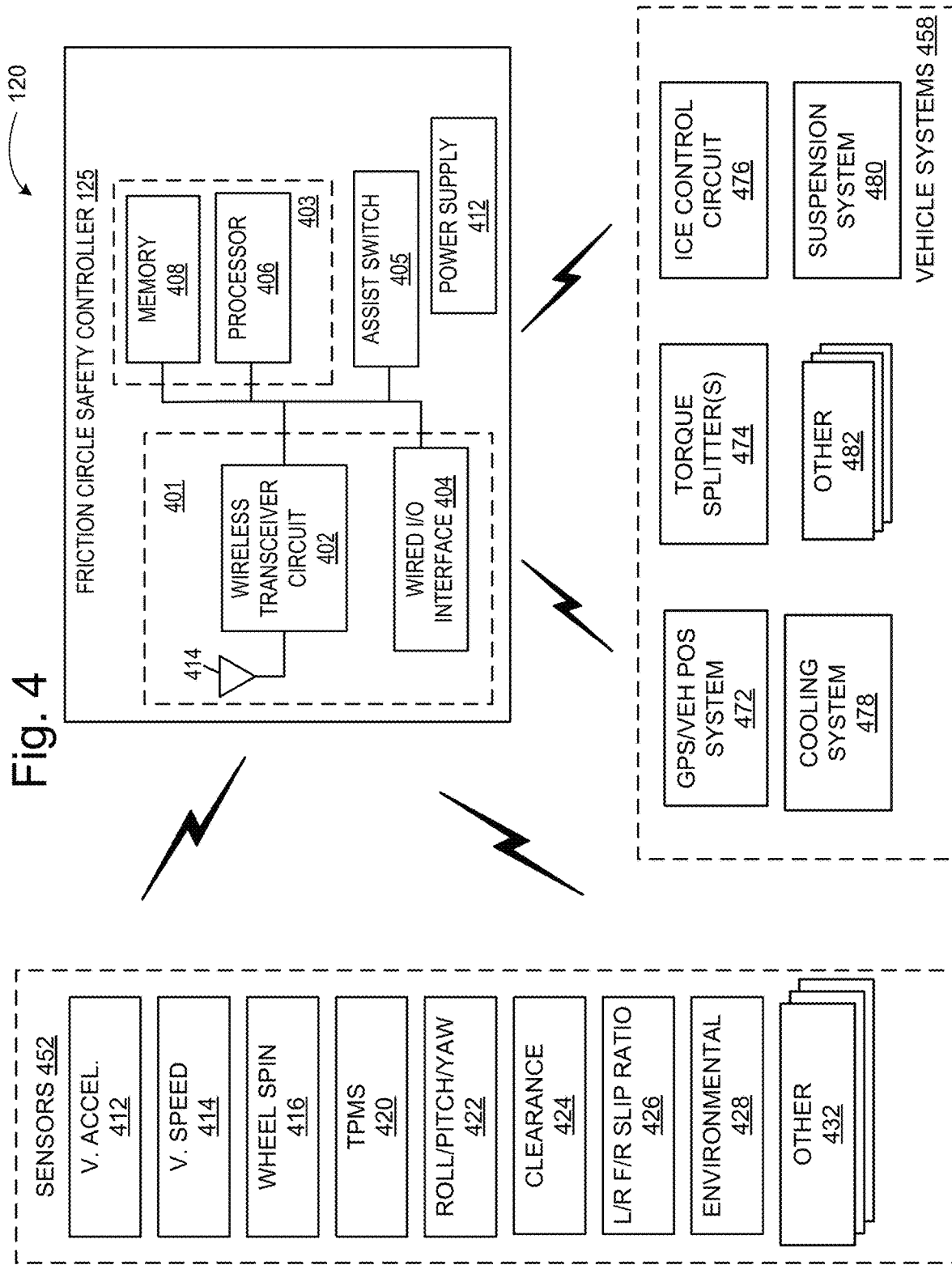
FIG. 4 illustrates an example communication architecture of the vehicle shown in FIG. 1, in accordance with one embodiment of the systems and methods described herein.

Although the example of FIG. 4 is illustrated using processor and memory circuitry, as described below with reference to circuits disclosed herein, friction circle safety controller 125 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the friction circle safety controller 125.

Communication circuit 401 either or both a wireless transceiver circuit 402 with an associated antenna 414 and a wired I/O interface 404 with an associated hardwired data port (not illustrated). As this example illustrates, communications with the friction circle safety controller 125 can include either or both wired and wireless communications circuits 401. In some embodiments, the communication circuit 401 may implement the IR wireless communications from the vehicle to a hydrogen fueling station. Wireless transceiver circuit 402 can include a transmitter and a receiver (not shown) to allow wireless communications via any of a number of communication protocols such as, for example, WiFi, Bluetooth, near field communications (NFC), Zigbee, IrDA, and any of a number of other wireless communication protocols whether standardized, proprietary, open, point-to-point, networked or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by friction circle safety controller 125 to/from other entities such as sensors 452 and vehicle systems 458.

Wired I/O interface 404 can include a transmitter and a receiver (not shown) for hardwired communications with other devices. For example, wired I/O interface 404 can provide a hardwired interface to other components, including sensors 452 and vehicle systems 458. Wired I/O interface 404 can communicate with other devices using Ethernet or any of a number of other wired communication protocols whether standardized, proprietary, open, point-to-point, networked or otherwise.

Power supply 412 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 452 can include, for example, sensors 452 such as those described above with reference to the example of FIG. 2. Sensors 452 can include additional sensors that may or may not otherwise be included on a standard vehicle with which the friction circle safety controller 125 is implemented. In the illustrated example, sensors 452 include vehicle acceleration sensors 412, vehicle speed sensors 414, wheelspin sensors 416 (e.g., one for each wheel), a tire pressure monitoring system (TPMS) 420, accelerometers such as a 3-axis accelerometer 422 to detect roll, pitch and yaw of the vehicle, vehicle clearance sensors 424, left-right and front-rear slip ratio sensors 426, and environmental sensors 428 (e.g., to detect salinity or other environmental conditions). Additional sensors 432 can also be included as may be appropriate for a given implementation.

Vehicle systems 458 can include any of a number of different vehicle components or subsystems used to control or monitor various aspects of the vehicle and its performance. In this example, the vehicle systems 458 include a GPS or other vehicle positioning system 472; torque splitters 474 they can control distribution of power among the vehicle wheels such as, for example, by controlling front/rear and left/right torque split; engine control circuits 476 to control the operation of engine (e.g. Internal combustion engine 14); cooling systems 478 to provide cooling for the motors, power electronics, the engine, or other vehicle systems; suspension system 480 such as, for example, an adjustable-height air suspension system, and other vehicle systems.

During operation, the friction circle safety controller 125 can receive information from various vehicle sensors 452. Also, the driver may manually activate the cruise control mode by operating switch 405. Communication circuit 401 can be used to transmit and receive information between the friction circle safety controller 125 and sensors 452, and the friction circle safety controller 125 and vehicle systems 458. Also, sensors 452 may communicate with vehicle systems 458 directly or indirectly (e.g., via communication circuit 401 or otherwise).

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Figure 5:
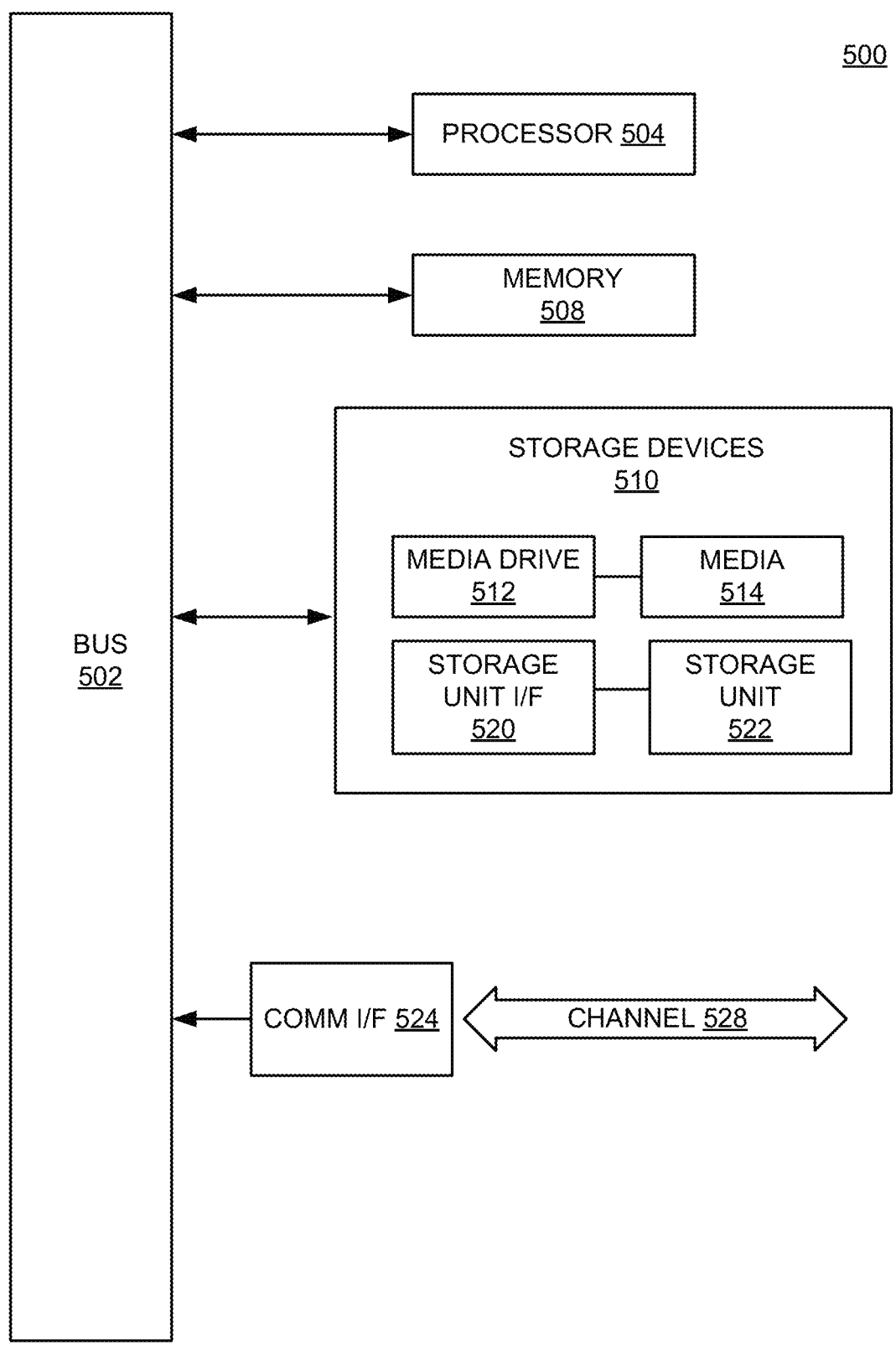
FIG. 5 is an example computing component that may be used to implement various features of embodiments described in the present disclosure.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 602. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 602 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 624. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
one or more sensors receiving vehicle data;
a vehicle controller, wherein the vehicle controller:
determines a friction circle for a vehicle based on an analysis of the vehicle data;
dynamically analyzes a current movement of the vehicle based on the friction circle; and
in response to a determination that the current movement of the vehicle has met a threshold of the friction circle, provides haptic cues to a driver of the vehicle for a determined dynamic interaction between lateral control input of the vehicle and longitudinal control input of the vehicle to maintain operation of the vehicle within the friction circle, wherein the haptic cues for the driver of the vehicle enable additional input to be applied to the lateral control input of the vehicle to compensate for a longitudinal movement of the vehicle in the determined dynamic interaction and additional input to be applied to the longitudinal control input of the vehicle to compensate for a lateral movement of the vehicle in the determined dynamic interaction.

2. The system of claim 1, wherein the friction circle represents a maximum traction limit associated with one or more tires of the vehicle.

3. The system of claim 2, wherein the vehicle data is related to frictional traction of one or more tires of a vehicle on a road surface.

4. The system of claim 2, wherein the threshold of the friction circle represents a maximum traction budget associated with the one or more tires of the vehicle, the maximum traction budget being a reduced percentage of the maximum traction limit.

5. The system of claim 3, wherein the determination that the current movement of the vehicle has met a threshold with respect to the friction circle comprises determining that the current movement of the vehicle is approaching a boundary of the friction circle.

6. The system of claim 1, wherein current movement of the vehicle comprises a lateral acceleration and longitudinal acceleration.

7. The system of claim 6, comprising:
a steering wheel receiving the lateral control input to control the lateral acceleration of the vehicle; and
a throttle pedal receiving the longitudinal control input to control the longitudinal acceleration of the vehicle.

8. The system of claim 7, wherein the feedback comprises controlling the steering wheel and the throttle pedal to adjust for lateral acceleration of the vehicle and longitudinal acceleration of the vehicle.

9. The system of claim 8, wherein the haptic cues comprise the vehicle controller communicating controls to the steering wheel applying a resistance force in a first angular direction to prevent the steering wheel from receiving input in a second angular direction.

10. The system of claim 9, wherein the haptic cues comprise the vehicle controller communicating controls to the throttle pedal applying a resistive pressure to prevent the throttle pedal from receiving additional input.

11. The system of claim 8, wherein the haptic cues comprise the vehicle controller communicating controls to a brake pedal applying pressure to the brake pedal to adjust for lateral acceleration of the vehicle.

12. The system of claim 11, wherein the vehicle controller communicates controls to the brake pedal to decrease the lateral acceleration of the vehicle.

13. The system of claim 1, wherein the feedback comprises generating a visual cue for the driver.

14. The system of claim 13, wherein the vehicle controller communicates controls to a head unit display of the vehicle to display the visual cue as a representation of the friction circle and the current movement of the vehicle with respect to the friction circle.

15. A non-transitory computer readable medium comprising instructions, that when read by a processor, cause the processor to perform:
receiving vehicle data, wherein the vehicle data is related to frictional traction of one or more tires of a vehicle on a road surface;
determining a friction circle for a vehicle based on an analysis of the vehicle data;
dynamically analyzing a current movement of the vehicle based on the friction circle; and
in response to a determination that the current movement of the vehicle has met a threshold of the friction circle, providing haptic cues to a driver of the vehicle for a determined dynamic interaction between lateral control input of the vehicle and longitudinal control input of the vehicle to maintain operation of the vehicle within the friction circle, wherein the haptic cues for a driver of the vehicle enable additional input to be applied to the lateral control input of the vehicle to compensate for a longitudinal movement of the vehicle in the determined dynamic interaction and additional input to be applied to the longitudinal control input of the vehicle to compensate for a lateral movement of the vehicle in the determined dynamic interaction.

16. The non-transitory computer readable medium of claim 15, comprising instructions that cause the processor to further perform:
applying haptic cues for a driver to adjust the relationship between the lateral control input of the vehicle and the longitudinal control input of the vehicle to maintain operation of the vehicle within the friction circle, wherein the haptic cues are applied to one or more of: a steering wheel, a throttle pedal, and a brake pedal.

17. The non-transitory computer readable medium of claim 15, wherein the friction circle represents a maximum traction limit associated with the one or more tires of the vehicle.

18. The non-transitory computer readable medium of claim 17, wherein the threshold of the friction circle represents a maximum traction budget associated with the one or more tires of the vehicle, the maximum traction budget being a reduced percentage of the maximum traction limit.

19. The non-transitory computer readable medium of claim 18, wherein determining that the current movement of the vehicle has met a threshold with respect to the friction circle comprises determining that the current movement of the vehicle is approaching a boundary of the friction circle.

20. The non-transitory computer readable medium of claim 16, wherein the haptic cues comprise one or more of: applying a resistance force in a first angular direction to the steering wheel to prevent the steering wheel from receiving input in a second angular direction; applying a resistive pressure to the throttle pedal to prevent the throttle pedal from receiving additional input; and applying pressure to the brake pedal to adjust for lateral acceleration of the vehicle.

\* \* \* \* \*